United States Patent
Hwang et al.

(10) Patent No.: US 10,670,796 B2
(45) Date of Patent: Jun. 2, 2020

(54) ORGANIC-INORGANIC HYBRID COMPOSITION, OPTICAL MEMBER AND OPTICAL DEVICE PREPARED USING THE SAME

(71) Applicant: LMS CO., LTD., Gyeonggi-do (KR)

(72) Inventors: Joon Hwan Hwang, Seoul (KR); Yong Jin Kang, Seoul (KR)

(73) Assignee: LMS CO., LTD., Pyeongtaek-si (KR)

( * ) Notice: Subject to any disclaimer, the term of this patent is extended or adjusted under 35 U.S.C. 154(b) by 628 days.

(21) Appl. No.: 14/786,887

(22) PCT Filed: Apr. 22, 2014

(86) PCT No.: PCT/KR2014/003524
§ 371 (c)(1),
(2) Date: Oct. 23, 2015

(87) PCT Pub. No.: WO2014/175644
PCT Pub. Date: Oct. 30, 2004

(65) Prior Publication Data
US 2016/0070053 A1    Mar. 10, 2016

(30) Foreign Application Priority Data
Apr. 23, 2013  (KR) .................. 10-2013-0044743

(51) Int. Cl.
| | |
|---|---|
| G02B 1/04 | (2006.01) |
| F21V 8/00 | (2006.01) |
| C08K 3/10 | (2018.01) |
| C08K 9/04 | (2006.01) |
| C08F 222/10 | (2006.01) |

(52) U.S. Cl.
CPC .............. G02B 6/0053 (2013.01); C08K 3/10 (2013.01); C08K 9/04 (2013.01); G02B 1/04 (2013.01); *C08F 2222/1086* (2013.01)

(58) Field of Classification Search
CPC .............................................. C08K 2003/2251
USPC ......................................................... 428/403
See application file for complete search history.

(56) References Cited

U.S. PATENT DOCUMENTS

| | | | | |
|---|---|---|---|---|
| 6,031,458 A | * | 2/2000 | Jacobsen ............ | G08B 13/2414 340/572.1 |
| 6,383,980 B1 | * | 5/2002 | Hagihara ................. | B01J 23/02 106/287.13 |
| 2007/0047087 A1 | * | 3/2007 | Fukuda .................... | G02B 1/111 359/582 |
| 2007/0146887 A1 | * | 6/2007 | Ikeda ...................... | G02B 1/111 359/586 |

(Continued)

FOREIGN PATENT DOCUMENTS

EP    2042528 A1 *   4/2009   ............ C08F 220/30

*Primary Examiner* — Elizabeth A Robinson
(74) *Attorney, Agent, or Firm* — Polsinelli PC (57) ABSTRACT

Disclosed is an organic-inorganic hybrid composition. The organic-inorganic hybrid composition includes a curable resin and inorganic particles dispersed in the curable resin. The inorganic particle has a core-shell structure composed of a core containing titanium and barium, and a shell containing at least one selected from zirconium, aluminum and chromium. According to this organic-inorganic hybrid composition, a liquid-phase refractive index of the composition can be improved, and as a result, luminance and light transmittance can be improved in an optical member using the same.

17 Claims, 1 Drawing Sheet

(56) References Cited

U.S. PATENT DOCUMENTS

| | | | | |
|---|---|---|---|---|
| 2010/0143702 | A1* | 6/2010 | Im | C09D 133/14 |
| | | | | 428/327 |
| 2011/0147891 | A1* | 6/2011 | Furukawa | H01G 4/10 |
| | | | | 257/532 |
| 2012/0065312 | A1* | 3/2012 | Ishihara | B82Y 30/00 |
| | | | | 524/403 |
| 2012/0132108 | A1* | 5/2012 | Ishihara | B82Y 30/00 |
| | | | | 106/287.1 |

* cited by examiner

ORGANIC-INORGANIC HYBRID COMPOSITION, OPTICAL MEMBER AND OPTICAL DEVICE PREPARED USING THE SAME

CROSS-REFERENCE TO RELATED APPLICATIONS

This application is a national phase application under 35 U.S.C. § 371 of International Patent Application No. PCT/KR2014/003524 filed Apr. 22, 2014, which claims priority to and the benefit of Korean Patent Application No. 10-2013-0044743, filed on Apr. 23, 2013. The entire contents of the referenced applications are incorporated herein by reference.

BACKGROUND

1. Field of the Invention

The present invention relates to an organic-inorganic hybrid composition containing an inorganic particle and a curable resin, an optical member prepared using the composition, and an optical device including the optical member.

2. Discussion of Related Art

Liquid crystals of a liquid crystal display (LCD), which is a form of a display, cannot emit light by themselves but only pass through or block the light in accordance with the electric signal input. Therefore, in order to display information on the display panels of LCDs, the LCD device needs an illumination unit that illuminates the display panel from the back of the display panel.

The illumination device used in displays may include a light source that provides light, a light-guide plate that guides the light provided by the light source towards a display panel, and an optical sheet that diffuses and/or collects the light passed through the light guide plate for provision to the display panel. Such optical sheets may include a diffusion sheet that scatters the light, and a light-collecting sheet that collects the light.

However, about 50% or more of the light emitted from the light source is lost by those optical sheets themselves. Although attempts have been made to address this problem by altering structures of the optical sheets, such as diffusing or light-collecting patterns, such structural alteration can only be done to a certain extent. Therefore, a different approach that aims to produce optical sheets with material having a high refractivity has been made, so as to minimize the amount of light loss by emission in directions other than toward the display panel.

However, it is difficult to endow an optical sheet with the advantage of high refractivity, solely by characteristics of the organic composition constituting the optical sheet alone. Also, since it is inevitable that a sulfur compound prone to yellowing will be used to produce low cost optical sheets with a high refractivity, a problem of reduced product reliability occurs.

Also, among other optical sheets, a light-collecting sheet is a sheet that has a light-collecting pattern which comprises a plurality of prisms. Prism-mountains of the respective prisms assume a structure that is prone to becoming compressed and collapsing under external stress. When the prism-mountains are damaged due to external stress, the viewer perceives the presence of mark on the LCD device, resulting in degradation in the quality of display.

SUMMARY OF THE INVENTION

The technical aspect of the present invention was conceived in the context described above, and accordingly, the present invention aims to provide an organic-inorganic hybrid composition with an improved reliability that can improve a liquid-phase refractive index, luminance and light transmittance.

Another aspect of the present invention aims to provide an optical member formed by the composition.

Still another aspect of the present invention aims to provide an optical device including the optical member.

An organic-inorganic hybrid composition according to an embodiment of the present invention includes a curable resin and inorganic particles dispersed in the curable resin. The inorganic particle is composed of a core containing titanium and barium, and a shell containing at least one selected from zirconium, aluminum and chromium.

As an embodiment of the present invention, the weight ratio of the core to the shell of the inorganic particle may range from about 40:60 to 90:10, and the average particle diameter of the inorganic particle may range from about 1 nm to 80 nm.

As an example, the core of the inorganic particle may contain titanium and barium, the shell of the inorganic particle may contain zirconium, and, the content of barium in the core may range from about 0.1 to 15 parts by weight per 100 parts by weight of titanium.

As another example, the shell of the inorganic particle may further contain aluminum, and in the shell, the content of aluminum may range from about 0.1 to 20 parts by weight per 100 parts by weight of zirconium.

As still another example, the shell of the inorganic particle may further contain chromium, and in the shell, the weight ratio of the total weight of zirconium and aluminum to chromium may range from about 100:0.01 to 100:10.

In the organic-inorganic hybrid composition, the weight ratio of the curable resin to the inorganic particle may range from about 100:5 to 100:70.

An optical member according to an embodiment of the present invention includes a base film, a polymer resin layer, and an inorganic particle dispersed within the polymer resin layer and having a core-shell structure composed of a core containing titanium and barium, and a shell containing at least one selected from zirconium, aluminum and chromium.

As an example, the polymer resin layer may have a light-collecting pattern in the form of triangular prisms on its emissive face.

An optical device according to an embodiment of the present invention includes a light source that generates light, a diffusion sheet that diffuses the light provided by the light source, and a light-collecting sheet that collects the light diffused by the diffusion sheet. The light-collecting sheet includes a base film, a polymer resin layer and inorganic particles, which are disposed above the diffusion sheet. The inorganic particles are composed of a core containing titanium and barium, and a shell containing at least one selected from zirconium, aluminum and chromium, and the inorganic particles are dispersed within the polymer resin layer.

DETAILED DESCRIPTION OF EXEMPLARY EMBODIMENTS

Hereinafter, embodiments of the present invention are described in further detail with reference to the accompanying drawings. Since the present invention may have various modifications and be embodied in many alternative forms, some exemplary embodiments are shown in the drawings and described in further details in the present specifications. However, it should be understood that there is no intent to limit the present invention to a particular embodiment disclosed herein, but to the contrary, the exemplary embodiments are to cover all modifications, equivalents and alternatives, which fall within the scope of the present invention. Referring to the accompanying drawings, like reference numerals are used to refer to like parts. Also, in the drawings, dimensions of the elements are exaggerated for the purpose of clarity.

It will be understood that, although the terms "first," "second," etc. may be used herein to describe various elements, these elements should not be limited by these terms. These terms are only used to distinguish one element from another. For example, a first component could be termed a second component, an, similarly, a second component could be termed a first component without departing from the teachings of the present invention.

All terms used herein are used in order to improve the understanding of certain exemplary embodiments, and are not intended to limit the scope of the present invention. The singular forms "a" "an" and "the" include plural referents, unless the context clearly dictates otherwise. It should be understood that the terms such as "to include" or "to have" used herein specify the presence of stated features, steps, operations, elements, components or a combination thereof, and do not preclude the presence or addition of one or more other features, steps, operations, elements, components or a combination thereof.

Unless otherwise defined, all terms, including technical and scientific terms, used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Organic-Inorganic Hybrid Composition

An organic-inorganic hybrid composition according to an embodiment of the present invention includes a curable resin and inorganic particles dispersed in the curable resin.

(a) Curable Resin

Various materials may be used to form the curable resin, and there is no particular limitation so long as the material allows the dispersion of the inorganic particles. As an example, a photo-curable resin or thermosetting resin may be used as the curable resin. For example, as the photo-curable resin, an UV-curable resin may be used.

The photo-curable resin includes a photo-curable compound. As the photo-curable compound, any monomer known to be photo-curable may be used without limitation.

Specific examples of the photo-curable compound include 2-phenoxyethyl acrylate, 2-phenoxyethyl(meth)acrylate, 3-phenoxy propyl acrylate, 3-phenoxy propyl(meth)acrylate, 4-phenoxy butyl acrylate, 4-phenoxy-butyl(meth)acrylate, 5-phenoxy-pentyl acrylate, 5-phenoxy-pentyl(meth)acrylate, 6-phenoxy-hexyl acrylate, 6-phenoxy-hexyl(meth)acrylate, 7-phenoxy-heptyl acrylate, 7-phenoxy-heptyl(meth)acrylate, 8-phenoxy-octyl acrylate, 8-phenoxy-octyl(meth)acrylate, 9-phenoxy-nonyl acrylate, 9-phenoxy-nonyl(meth)acrylate, 10-phenoxy-decyl acrylate, 10-phenoxy-decyl(meth)acrylate, 2-(phenylthio)ethyl acrylate, 2-(phenylthio)ethyl(meth)acrylate, 3-(phenylthio)propyl acrylate, 3-(phenylthio)propyl(meth)acrylate, 4-(phenylthio)butyl acrylate, 4-(phenylthio)butyl(meth)acrylate, 5-(phenylthio)pentyl acrylate, 5-(phenylthio)pentyl(meth) acrylate, 6-(phenylthio)hexyl acrylate, 6-(phenylthio)hexyl(meth)acrylate, 7-(phenylthio)heptyl acrylate, 7-(phenylthio)heptyl(meth)acrylate, 8-(phenylthio)octyl acrylate, 8-(phenylthio)octyl(meth)acrylate, 9-(phenylthio)nonyl acrylate, 9-(phenylthio)nonyl(meth)acrylate, 10-(phenylthio)decyl acrylate, 10-(phenylthio)decyl(meth)acrylate, 2-(naphthalen-2-yloxy)ethyl acrylate, 2-(naphthalen-2-yloxy)ethyl(meth)acrylate, 3-(naphthalen-2-yloxy)propyl acrylate, 3-(naphthalen-2-yloxy)propyl(meth)acrylate, 4-(naphthalen-2-yloxy)butyl acrylate, 4-(naphthalen-2-yloxy)butyl(meth)acrylate, 5-(naphthalen-2-yloxy)pentyl acrylate, 5-(naphthalen-2-yloxy)pentyl(meth)acrylate, 6-(naphthalen-2-yloxy)hexyl acrylate, 6-(naphthalen-2-yloxy)hexyl(meth)acrylate, 7-(naphthalen-2-yloxy)heptyl acrylate, 7-(naphthalen-2-yloxy)heptyl(meth)acrylate, 8-(naphthalene-2-yloxy)octyl acrylate, 8-(naphthalen-2-yloxy)octyl(meth)acrylate, 9-(naphthalen-2-yloxy)nonyl acrylate, 9-(naphthalen-2-yloxy)nonyl(meth)acrylate, 10-(naphthalen-2-yloxy)decyl acrylate, 10-(naphthalen-2-yloxy)decyl(meth)acrylate, 2-(naphthalen-2-ylthio)ethyl acrylate, 2-(naphthalen-2-ylthio)ethyl(meth)acrylate, 3-(naphthalen-2-ylthio)propyl acrylate, 3-(naphthalen-2-ylthio)propyl(meth)acrylate, 4-(naphthalen-2-ylthio)butyl acrylate, 4-(naphthalen-2-ylthio)butyl(meth)acrylate, 5-(naphthalen-2-ylthio)pentyl acrylate, 5-(naphthalen-2-ylthio)pentyl(meth)acrylate, 6-(naphthalen-2-ylthio)hexyl acrylate, 6-(naphthalen-2-ylthio)hexyl(meth)acrylate, 7-(naphthalen-2-ylthio)heptyl acrylate, 7-(naphthalen-2-ylthio)heptyl(meth)acrylate, 8-(naphthalen-2-ylthio)octyl acrylate, 8-(naphthalen-2-ylthio)octyl(meth)acrylate, 9-(naphthalen-2-ylthio)nonyl acrylate, 9-(naphthalen-2-ylthio)nonyl(meth)acrylate, 10-(naphthalen-2-ylthio)decyl acrylate, 10-(naphthalen-2-ylthio)decyl(meth)acrylate, 2-([1,1'-biphenyl]-4-yloxy)ethyl acrylate, 2-([1,1'-biphenyl]-4-yloxy)ethyl(meth)acrylate, 3-([1,1'-biphenyl]-4-yloxy)propyl acrylate, 3-([1,1'-biphenyl]-4-yloxy)propyl (meth)acrylate, 4-([1,1'-biphenyl]-4-yloxy)butyl acrylate, 4-([1,1'-biphenyl]-4-yloxy)butyl(meth)acrylate, 5-([1,1'-biphenyl]-4-yloxy)pentyl acrylate, 5-([1,1'-biphenyl]-4-yloxy)pentyl(meth)acrylate, 6-([1,1'-biphenyl]-4-yloxy)hexyl acrylate, 6-([1,1'-biphenyl]-4-yloxy)hexyl(meth)acrylate, 7-([1,1'-biphenyl]-4-yloxy)-heptyl acrylate rate, 7-([1,1'-biphenyl]-4-yloxy)heptyl(meth)acrylate, 8-([1,1'-biphenyl]-4-yloxy)octyl acrylate, 8-([1,1'-biphenyl]-4-yloxy)octyl(meth)acrylate, 9-([1,1'-biphenyl]-4-yloxy) nonyl acrylate, 9-([1,1'-biphenyl]-4-yloxy)nonyl(meth) acrylate, 10-([1,1'-biphenyl]-4-yloxy)decyl acrylate, 10-([1,1'-biphenyl]-4-yloxy)decyl(meth)acrylate, 2-([1,1'-biphenyl]-4-ylthio) ethyl acrylate, 2-([1,1'-biphenyl]-4-ylthio)ethyl(meth)acrylate, 3-([1,1'-biphenyl]-4-ylthio) propyl acrylate, 3-([1,1'-biphenyl]-4-ylthio)propyl(meth) acrylate, 4-([1,1'-biphenyl]-4-ylthio)butyl acrylate, 4-([1,1'-biphenyl]-4-ylthio)butyl(meth)acrylate, 5-([1,1'-biphenyl]-4-ylthio)pentyl acrylate, 5-([1,1'-biphenyl]-4-ylthio)pentyl (meth)acrylate, 6-([1,1'-biphenyl]-4-ylthio)hexyl acrylate, 6-([1,1'-biphenyl]-4-ylthio)hexyl(meth)acrylate, 7-([1,1'-biphenyl]-4-ylthio)heptyl acrylate, 7-([1,1'-biphenyl]-4-ylthio)heptyl(meth)acrylate, 8-([1,1'-biphenyl]-4-ylthio)octyl acrylate, 8-([1,1'-biphenyl]-4-ylthio)octyl(meth)acrylate, 9-([1,1'-biphenyl]-4-ylthio)nonyl acrylate, 9-([1,1'-biphenyl]-4-ylthio)nonyl(meth)acrylate, 10-([1,1'-biphenyl]-4-ylthio)decyl acrylate, 10-([1,1'-biphenyl]-4-ylthio)decyl (meth)acrylate, 2-hydroxy-2-phenoxyethyl acrylate, 2-hydroxy-2-phenoxyethyl(meth)acrylate, 2-hydroxy-2-(naphthalen-2-yloxy)ethyl acrylate, 2-hydroxy-2-(naphthalen-2-yloxy)ethyl(meth)acrylate, 2-([1,1'-biphenyl]-4-yloxy)ethyl acrylate, 2-([1,1'-biphenyl]-4-yloxy)ethyl(meth)

acrylate, 2-(2-phenoxy-ethoxy)ethyl acrylate, 2-(2-phenoxy-ethoxy)ethyl(meth)acrylate, 2-(phenoxy-methoxy) ethyl acrylate, 2-(phenoxy-methoxy)ethyl(meth)acrylate, 2-(([1,1'-biphenyl]-4-yloxy)methoxy)ethyl acrylate, 2-((([1, 1'-biphenyl]-4-yloxy)methoxy)ethyl(meth)acrylate, 2-((naphthalen-2-yloxy)methoxy)ethyl acrylate, 2-((naphthalen-2-yloxy)methoxy)ethyl(meth)acrylate, 2-((phenylthio)methoxy)ethyl acrylate, 2-((phenylthio)methoxy)ethyl (meth)acrylate, 2-((naphthalen-2-ylthio)methoxy)ethyl acrylate, 2-((naphthalen-2-ylthio)methoxy)ethyl(meth)acrylate, 2,2'-(4,4'(9H-fluorene-9,9-diyl)bis(4,1-phenylene))bis (oxy)bis(ethane-2,1-diyl)diacrylate, 2,2'-(4,4'(9H-fluorene-9,9-diyl)bis(4,1-phenylene))bis(oxy)bis(ethane-2,1-diyl)bis (2-methyl acrylate), 3,3'(4,4'-(9H-fluorene-9,9-diyl)bis(4,1-phenylene))bis(oxy)bis(propan-3,1-diyl)diacrylate, 3,3'-(4, 4'-(9H-fluorene-9,9-diyl)bis(4,1-phenylene))bis(oxy)bis (propan-3,1-diyl)bis(2-methyl acrylate), 2,2'-(4,4'-(9H-fluorene-9,9-diyl)bis(4,1-phenylene))bis(sulfandiyl)bis (ethan-2,1-diyl)diacrylate, 2,2'-(4,4'-(9H-fluorene-9,9-diyl) bis(4,1-phenylene))bis(sulfandiyl)bis(ethan-2,1-diyl)bis(2-methyl acrylate), 3,3'-(4,4'-(9H-fluorene-9,9-diyl)bis(4,1-phenylene))bis(sulfandiyl)bis(propan-3,1-diyl)diacrylate, 3,3'-(4,4'-(9H-fluorene-9,9-diyl)bis(4,1-phenylene))bis(sulfandiyl)bis(propan-3,1-diyl)bis(2-methyl acrylate), 2,2'-(4, 4'-(4,4'-(9H-fluorene-9,9-diyl)bis(4,1-phenylene))bis(oxy) bis(4,1-phenylene))bis(oxy)bis(ethan-2,1-diyl)diacrylate, 2,2'-(4,4'-(4,4'-(9H-fluorene-9,9-diyl)bis(4,1-phenylene))bis (oxy)bis(4,1-phenylene))bis(oxy)bis(ethan-2,1-diyl)bis(2-methyl acrylate), 3,3'-(4,4'-(4,4'-(9H-fluorene-9,9-diyl)bis (4,1-phenylene))bis(oxy)bis(4,1-phenylene))bis(oxy)bis (propan-3,1-diyl)diacrylate, 3,3'-(4,4'-(4,4'-(9H-fluorene-9, 9-diyl)bis(4,1-phenylene))bis(oxy)bis(4,1-phenylene))bis (oxy)bis(propan-3,1-diyl)bis(2-methyl acrylate), 2,2'-(4,4'-(4,4'-(9H-fluorene-9,9-diyl)bis(4,1-phenylene))bis (sulfandiyl)bis(4,1-phenylene))bis(oxy)bis(ethan-2,1-diyl) diacrylate, 2,2'-(4,4'-(4,4'-(9H-fluorene-9,9-diyl)bis(4,1-phenylene))bis(sulfandiyl)bis(4,1-phenylene))bis(oxy)bis (ethan-2,1-diyl)bis(2-methyl acrylate), 3,3'-(4,4'-(4,4'-(9H-fluorene-9,9-diyl)bis(4,1-phenylene))bis(sulfandiyl)bis(4,1-phenylene))bis(oxy)bis(propan-3,1-diyl)diacrylate, 3,3'-(4, 4'-(4,4'-(9H-fluorene-9,9-diyl)bis(4,1-phenylene))bis (sulfandiyl)bis(4,1-phenylene))bis(oxy)bis(propan-3,1-diyl) bis(2-methyl acrylate), 2,2'-(2,2'-(4,4'-(9H-fluorene-9,9-diyl)bis(4,1-phenylene))bis(oxy)bis(ethan-2,1-diyl))bis (oxy)bis(ethan-2,-1-diyl)diacrylate, 2,2'-(2,2'-(4,4'-(9H-fluorene-9,9-diyl)bis(4,1-phenylene))bis(oxy)bis(ethan-2,1-diyl))bis(oxy)bis(ethan-2,-1-diyl)bis(2-methyl acrylate). 2,2'-(2,2'-(4,4'-(9H-fluorene-9,9-diyl)bis(4,1-phenylene))bis (sulfandiyl)bis(ethan-2,1-diyl))bis(oxy)bis(ethan-2,-1-diyl) diacrylate, 2,2'-(2,2'-(4,4'-(9H-fluorene-9,9-diyl)bis(4,1-phenylene))bis(sulfandiyl)bis(ethan-2,1-diyl))bis(oxy)bis (ethan-2,-1-diyl)bis(2-methyl acrylate), 2,2'-(4,4'-oxybis(4, 1-phenylene)bis(oxy))bis(ethan-2,1-diyl(diacrylate, 2,2'-(4, 4'-oxybis(4,1-phenylene)bis(oxy))bis(ethan-2,1-diyl)bis(2-methyl acrylate), 2,2'-(4,4'-oxybis(4,1-phenylene)bis (sulfandiyl))bis(ethan-2,1-diyl)diacrylate, 2,2'-(4,4'-oxybis (4,1-phenylene)bis(sulfandiyl))bis(ethan-2,1-diyl)bis(2-methyl acrylate), 2,2'-(4,4'-thiobis(4,1-phenylene)bis(oxy)) bis(ethan-2,1-diyl)diacrylate, 2,2'-(4,4'-thiobis(4,1-phenylene)bis(oxy))bis(ethan-2,1-diyl)bis(2-methyl acrylate), 2,2'-(4,4'-thiobis(4,1-phenylene)bis(sulfandiyl)) bis(ethan-2,1-diyl)diacrylate, 2,2'-(4,4'-thiobis(4,1-phenylene)bis(sulfandiyl))bis(ethan-2,1-diyl)bis(2-methyl acrylate), 2,2'-(3,3'-(4,4'-oxybis(4,1-phenylene)bis(oxy))bis (propane-3,1-diyl))bis(oxy)bis(ethan-2,1-diyl)diacrylate, 2,2'-(3,3'-(4,4'-oxybis(4,1-phenylene)bis(oxy))bis(propane-3,1-diyl))bis(oxy)bis(ethan-2,1-diyl)bis(2-methyl acrylate), 2,2'-(3,3'-(4,4'-thiobis(4,1-phenylene)bis(oxy))bis(propane-3,1-diyl))bis(oxy)bis(ethan-2,1-diyl)diacrylate, 2,2'-(3,3'-(4, 4'-thiobis(4,1-pheylene)bis(oxy))bis(propane-3,1-diyl))bis (oxy)bis(ethan-2,1-diyl)bis(2-methyl acrylate), 2,2'-(3,3'-(4, 4'-oxybis(4,1-phenylene)bis(sulfandiyl))bis(propane-3,1-diyl))bis(oxy)bis(ethan-2,1-diyl(diacrylate, 2,2'-(3,3'-(4,4'-oxybis(4,1-phenylene)bis(sulfandiyl))bis(propane-3,1-diyl))bis(oxy)bis(ethan-2,1-diyl)bis(2-methyl acrylate), 2,2'-(3,3'-(4,4'-thiobis(4,1-phenylene)bis(sulfandiyl))bis (propane-3,1-diyl))bis(oxy)bis(ethan-2,1-diyl(diacrylate, 2,2'-(3,3'-(4,4'-thiobis(4,1-phenylene)bis(sulfandiyl))bis (propane-3,1-diyl))bis(oxy)bis(ethan-2,1-diyl)bis(2-methyl acrylate), 2,2'-(4,4'-(propane-2,2-diyl)bis(4,1-phenylene)) bis(oxy)bis(ethan-2,1-diyl(diacrylate, 2,2'-(4,4'-(propane-2, 2-diyl)bis(4,1-phenylene))bis(oxy)bis(ethan-2,1-diyl)bis(2-methyl acrylate), 2,2'-(4,4'-(propane-2,2-diyl)bis(4,1-phenylene))bis(sulfandiyl)bis(ethan-2,1-diyl)diacrylate, 2,2'-(4,4'-(propane-2,2-diyl)bis(4,1-phenylene))bis(sulfandiyl)bis(ethan-2,1-diyl)bis(2-methyl acrylate), 2,2'-(2,2'-(4,4'-(propane-2,2-diyl)bis(4,1-phenylene))bis(oxy)bis (ethan-2,1-diyl))bis(oxy)bis(ethan-2,1-diyl(diacrylate, 2,2'-(2,2'-(4,4'-(propane-2,2-diyl)bis(4,1-phenylene))bis(oxy)bis (ethan-2,1-diyl))bis(oxy)bis(ethan-2,1-diyl)bis(2-methyl acrylate), 2,2'-(2,2'-(4,4'-(propane-2,2-diyl)bis(4,1-phenylene)bis(sulfandiyl)bis(ethan-2,1-diyl))bis(oxy)bis (ethan-2,1-diyl)diacrylate, 2,2'-(2,2'-(4,4'-(propane-2,2-diyl)bis(4,1-phenylene))bis(sulfandiyl)bis(ethan-2,1-diyl)) bis(oxy)bis(ethan-2,1-diyl)bis(2-methyl acrylate), 2,2'-(2,2'-(2,2'-(4,4'-(propane-2,2-diyl)bis(4,1-phenylene))bis(oxy)bis (ethan-2,1-diyl))bis(oxy)bis(ethan-2,1-diyl))bis(oxy)bis (ethan-2,1-diyl(diacrylate, 2,2'-(2,2'-(2,2'-(4,4'-(propane-2, 2-diyl)bis(4,1-phenylene))bis(oxy)bis(ethan-2,1-diyl))bis (oxy)bis(ethan-2,1-diyl))bis(oxy)bis(ethan-2,1-diyl)bis(2-methyl acrylate), 2,2'-(2,2'-(2,2'-(4,4'-(propane-2,2-diyl)bis (4,1-phenylene))bis(sulfandiyl)bis(ethan-2,1-diyl))bis(oxy) bis(ethan-2,1-diyl))bis(oxy)bis(ethan-2,1-diyl(diacrylate, 2,2'-(2,2'-(2,2'-(4,4'-(propane-2,2-diyl)bis(4,1-phenylene)) bis(sulfandiyl)bis(ethan-2,1-diyl))bis(oxy)bis(ethan-2,1-diyl))bis(oxy)bis(ethan-2,1-diyl)bis(2-methyl acrylate), 2,2'-(2,2'-(2,2'-(4,4'-oxybis(4,1-phenylene)bis(oxy))bis (ethan-2,1-diyl))bis(oxy)bis(ethan-2,1-diyl)bis(oxy)bis (ethan-2,1-diyl(diacrylate, 2,2'-(2,2'-(2,2'-(4,4'-oxybis(4,1-phenylene)bis(oxy))bis(ethan-2,1-diyl))bis(oxy)bis(ethan-2, 1-diyl))bis(oxy)bis(ethan-2,1-diyl)bis(2-methyl acrylate), 2,2'-(2,2'-(2,2'-(4,4'-thiobis(4,1-phenylene)bis(oxy))bis (ethan-2,1-diyl))bis(oxy)bis(ethan-2,1-diyl))bis(oxy)bis (ethan-2,1-diyl)diacrylate, 2,2'-(2,2'-(2,2'-(4,4'-thiobis(4,1-phenylene)bis(oxy))bis(ethan-2,1-diyl))bis(oxy)bis(ethan-2, 1-diyl))bis(oxy)bis(ethan-2,1-diyl)bis(2-methyl acrylate), 2,2'-(2,2'-(2,2'-(4,4'-thiobis(4,1-phenylene)bis(sulfandiyl)) bis(ethan-2,1-diyl)bis(oxy)bis(ethan-2,1-diyl))bis(oxy)bis (ethan-2,1-diyl(diacrylate, 2,2'-(2,2'-(2,2'-(4,4'-thiobis(4,1-phenylene)bis(sulfandiyl))bis(ethan-2,1-diyl)bis(oxy)bis (ethan-2,1-diyl))bis(oxy)bis(ethan-2,1-diyl)bis(2-methyl acrylate), polyester urethane diacrylate, tripropylene glycol diacrylate, urethane acrylate, epoxy acrylate, phenylthio ethyl(methyl)acrylate, isobornyl acrylate, 2-phenoxyethyl acrylate, phenoxyethyl(methyl)acrylate, phenoxy-2-methyl-ethyl(methyl)acrylate, phenoxy ethoxy ethyl(methyl)acrylate, phenoxy benzylacrylate, 3-phenoxy-2-hydroxypropyl (methyl)acrylate, 2-1-naphthyloxyethyl(methyl)acrylate, 2-2-naphthyloxyethyl(methyl)acrylate, 2-1-naphthylthio-ethyl(methyl)acrylate, 2-2-naphthylthioethyl(methyl)acrylate, and trimethylolpropane triacrylate, each of which may be used alone or in a combination of two or more.

The photo-curable compound may include a compound represented by the following Formula 1.

[Formula 1]

In the above Formula 1, $R_1$ represents an alkylene group having 2 to 10 carbons and in which a hydroxyl group is substituted or unsubstituted, $R_2$ represents hydrogen or a methyl group, Ar represents an arylene group having 6 to 40 carbons or a heteroarylene group having 3 to 40 carbons, Q represents oxygen or sulfur, and m and n each independently represent an integer ranging from 0 to 8.

In the above Formula 1, the alkylene group that $R_1$ represents may be expressed as '—$(CH_2)_x$—' where x represents an integer ranging from 2 to 10. The alkylene group may be a linear or branched carbon chain. At least one of hydrogens in the alkylene group represented by $R_1$ may be substituted or unsubstituted with a hydroxyl group (—OH) or an alkyl group ('—$(CH_2)_y$—$CH_3$' where y represents an integer ranging from 0 to 4) having 1 to 5 carbons.

As one example, in the above Formula 1, $R_1$ represents an alkylene group having 2 to 10 carbons and in which a hydroxyl group is substituted or unsubstituted, $R_2$ represents hydrogen or a methyl group, Ar represents an arylene group having 6 to 40 carbons, Q represents oxygen or sulfur, and m and n represent integers ranging from 1 to 8.

As another example, the photo-curable compound may include a compound having the following Formula 2.

[Formula 2]

In the above Formula 2, $R_1$ represents hydrogen or a methyl group, $R_2$ represents an alkylene group having 2 to 10 carbons and in which a hydroxyl group is substituted or unsubstituted, Ar represents an aryl group having 6 to 40 carbons or a heteroaryl group having 3 to 40 carbons, m represents an integer ranging from 0 to 8, and P represents oxygen or sulfur.

In the above Formula 2, the alkylene group represented as $R_2$ may be expressed as '—$(CH_2)_y$—' (where y is an integer from 2 to 10).

As one example, in the above Formula 2, $R_1$ represents hydrogen or a methyl group, $R_2$ represents an alkylene group having 2 to 10 carbons and in which a hydroxyl group is substituted or unsubstituted, Ar represents a phenyl group, napthyl group, biphenyl group or triphenyl group, m represents an integer ranging from 1 to 8, and P represents oxygen or sulfur.

As another example, the photo-curable compound includes a compound having the following Formula 3.

[Formula 3]

In the above Formula 3, $R_1$ represents hydrogen or a methyl group, $R_2$ represents an alkylene group having 2 to 10 carbons and in which a hydroxyl group is substituted or unsubstituted, $Ar_1$ and $Ar_2$ each independently represent an arylene group having 6 to 40 carbons or a heteroarylene group having 3 to 40 carbons, P represents oxygen or sulfur, Q represents oxygen or sulfur, and i, j, n and m each independently represent an integer ranging from 0 to 8, and Y represents —$C(CH_3)_2$—, —$CH_2$—, —S—, In the above Formula 3, the alkylene group that $R_2$ represents may be expressed as '—$(CH_2)_y$—' (where y represents an integer ranging from 2 to 10).

In an example, in the above Formula 3, $R_1$ represents hydrogen or a methyl group, $R_2$ represents an alkylene group having 2 to 10 carbons and in which a hydroxyl group is substituted or unsubstituted, $Ar_1$ and $Ar_2$ each independently represent an arylene group having 6 to 40 carbons, P represents oxygen or sulfur, Q represents oxygen or sulfur, and i, j, n and m each independently represent an integer ranging from 0 to 8, and Y represents —$C(CH_3)_2$—, —$CH_2$—, —S—, For example, a photo-curable resin according to an embodiment of the present invention may include the photo-curable monomer, at least one of the compounds represented by Formula 1, Formula 2 and Formula 3.

The photo-curable resin may further include a photoinitiator along with the photo-curable compound. Once the photo-curable resin is exposed to light, the photoinitiator absorbs energy and initiates polymerization of the photo-curable compound, and as the photo-curable compound becomes polymerized, a cured compound is formed as a result of curing the photo-curable resin.

There is no particular limitation on the type of the photoinitiator, and examples of the photoinitiator include a benzoin alkyl ether-based compound, a benzophenone-based compound, an acetophenone-based compound, and a phosphine oxide-based compound and the like.

(b) Inorganic Particles

An inorganic particle may have a core-shell structure, including a core and a shell that insulates at least part of the core. In the present invention, the term "core-shell structure" is used to refer not only to a structure in which the shell insulates the core completely, but also to a structure in which the shell insulates the core only partially.

The core of the inorganic particle contains titanium (Ti) and barium (Ba).

For example, the core may be composed of an oxide containing titanium and barium. In the core, barium may be contained in a ratio of 0.1 to 15 parts by weight per 100 parts by weight of titanium. In the case of the core containing barium less than 0.1 parts by weight per 100 parts by weight of titanium, the inorganic particle may have negligible influence on the liquid-phase refractive index and luminance of the organic-inorganic hybrid composition, whereas the core containing barium more than 15 parts by weight per 100 parts by weight of titanium may result in degradation in properties of the organic-inorganic hybrid composition.

The shell of the inorganic particle contains at least one of zirconium (Zr), aluminum (Al) and chromium (Cr).

For example, the shell may contain zirconium. For example, the shell may be formed by an oxide containing zirconium.

Unlike the above, the shell may contain zirconium and aluminum. Particularly, the shell may be formed by an oxide containing zirconium and aluminum. In such cases where the shell contains zirconium and aluminum, aluminum substitutes in part for costly zirconium, and this substitution may lead not only to improvement in the light transmittance and luminance but also to the reduction in production costs of the inorganic particle. In such cases, the content of aluminum in the shell may range from about 0.1 to 20 parts by weight per 100 parts by weight of zirconium. Particularly, the aluminum content may be, per 100 parts by weight of zirconium, in the range of about 0.5 to 4 parts by weight, about 0.5 to 15 parts by weight, about 1 to 15 parts by weight, or about 5 to 15 parts by weight. Particularly, the content of aluminum in the shell may be in the range of about 8 to 13 parts by weight per 100 parts by weight of zirconium. When the weight ratio of zirconium to aluminum in the shell is in the range of about 100:0.1 to about 100:20, the composition of the present invention that contains inorganic particles may have improvement in both processability and light transmittance, and also, when applied to an optical device for example, it may lead to improvement in luminance of the device.

As another example, the shell may further include chromium in addition to zirconium and aluminum. Particularly, the shell may be composed of an oxide containing zirconium, aluminum and chromium.

When the shell contains zirconium, aluminum and chromium, may reduce yellowing caused by UV rays in the organic-inorganic hybrid composition according to an embodiment of the present invention may be reduced. In this case, when the weight ratio of zirconium to aluminum is in one of the ranges cited above, the content of chromium may be in the range of about 0.01 to about 10 parts by weight with respect to the total weight of zirconium and aluminum being 100 parts by weight. More particularly, with respect to the total weight of zirconium and aluminum being 100 parts by weight, the content of chromium may be in the range of 0.1 to 10 parts by weight, 0.3 to 8 parts by weight, or 0.2 to 5 parts by weight. The shell containing chromium in addition to aluminum and zirconium, as in one of the ranges cited above, may lead to improvement in both processability and light transmittance of the composition containing inorganic particles, and also may effectively prevent yellowing caused by UV rays.

For the inorganic particles according to an embodiment of the present invention, the weight ratio of the core to the shell may be in the range of about 40:60 to 90:10. More preferably, with respect to the total weight of the inorganic particles, the content of the core may be in the range of about 40 weight % to 50 weight %, and the content of the shell may be in the range of about 50 weight % to 60 weight %.

There is no particular limitation on the size of the inorganic particle so long as it does not hinder the dispersion of the particles. As an example, the average particle diameter of the inorganic particles may be in the range of about 1 to 80 nm. More particularly, the average particle diameter of the inorganic particles may be in the range of about 1 nm to 50 nm. Here the mean diameter of inorganic particles is defined as the arithmetic average of the diameter of the particles according to the particle size analysis, and for example, the particle size provided by a commercial optical system, that is, an average diameter of an approximated spherical form of the particle.

With respect to the total weight of the organic-inorganic hybrid composition, the content of inorganic particles is not particularly limited so long as it does not hinder dispersion of the inorganic particles within the curable resin. For example, the content of the inorganic particles may be in the range of about 5 to 70 parts by weight per 100 parts by weight of the curable resin. More particularly, the content of the inorganic particles may be, with respect to 100 parts by weight of the curable resin, in the range of about 10 to 50 parts by weight, about 15 to 50 parts by weight, about 20 to 50 parts by weight, or about 20 to 60 parts by weight. In the composition containing the inorganic particles in one of the content ratios cited above, the inorganic particles may easily and uniformly disperse within the curable resin, and also the composition may have an excellent light transmittance and an excellent refractive index.

In an embodiment of the present invention, the organic-inorganic hybrid composition may further include a surface modifier that modifies the surface of the inorganic particles. Various materials may be used as a surface modifier, without particular limitation, to modify the surface of the inorganic particles.

For example, the surface modifier may be a silane compound. Specific examples of such a silane compound include compounds represented by the following Formula 4, Formula 5 and Formula 6.

[Formula 4]

[Formula 5]

[Formula 6]

In each of Formula 4, Formula 5 and Formula 6, $R^3$ represents an alkyl group having 1 to 12 carbons, an alkenyl group having 2 to 12 carbons, an alkynyl group having 2 to 12 carbons, an aryl group having 6 to 12 carbons, a halogen group, a substituted amino group, an amide group, an alkyl carbonyl group having 1 to 12 carbons, a carboxyl group, a mercapto group, a cyano group, a hydroxyl group, an alkoxy group having 1 to 12 carbons, an alkoxy carbonyl group having 1 to 12 carbons, a sulfonic acid group, a phosphate group, an acryloxy group, a metacryloxy group, an epoxy group or a vinyl group. Here in the case where $R^3$ represents an aryl group, at least one of the hydrogen atoms in the aryl group may or may not be substituted with an alkyl group having 1 to 6 carbons, an alkenyl group having 2 to 6 carbon atoms, or an alkynyl group having 2 to 6 carbon atoms.

Also, in each of Formula 4, Formula 5 and Formula 6, $R^4$ represents an alkyl group having 1 to 12 carbons, X represents hydrogen, a halogen group, an alkoxy group having 1 to 12 carbons, an acyloxy group having 1 to 12 carbons, an alkyl carbonyl group having 1 to 12 carbons, an alkoxy carbonyl group having 1 to 12 carbons, or $—N(R^5)_2$ ($R^5$ is H or an alkyl group having 1 to 12 carbons), and m is an integer ranging from 1 to 3.

For example, specific examples of the silane compound include isooctyl trimethoxy silane, 3-(methacryloyloxy)propyl trimethoxy silane, 3-acryloxypropyl trimethoxy silane, 3-(methacryloyloxy)propyl triethoxy silane, 3-(methacryloyloxy)propyl methyl dimethoxy silane, 3-(acryloyloxypropyl)methyl dimethoxy silane, 3-(methacryloyloxy)propyl dimethyl ethoxy silane, 3-(methacryloyloxy)propyl dimethyl ethoxy silane, vinyl dimethyl ethoxy silane, phenyl trimethoxy silane, n-octyl trimethoxy silane, dodecyl trimethoxy silane, octadecyl trimethoxy silane, propyl trimethoxy silane, hexyl trimethoxy silane, octadecyl trimethoxy silane, propyltrimethoxy silane, hexyl trimethoxy silane, vinyl methyldiacetoxy silane, vinyl methyldiethoxy silane, vinyl triacetoxy silane, vinyl triethoxy silane, vinyl tri-isopropoxy silane, vinyl trimethoxy silane, vinyl triphenoxy silane, vinyl tri-t-butoxy silane, vinyl tris-isobutoxy silane, vinyl triisopropenoxy silane, vinyl tris(2-methoxyethoxy)silane, styryl ethyl trimethoxy silane, mercapto propyltrimethoxy silane and 3-glycidoxy propyltrimethoxy silane, each of which may be used alone or in a combination of two or more.

As another example, the surface modifier may be a carboxylic acid compound, for example, the surface modifier may include at least one of compounds represented by the following Formula 7 and Formula 8.

$R^5—(CH_2)_m—COOH$ [Formula 7]

$R^5—(CH_2)_m—CH_2COOH$ [Formula 8]

In each of Formula 7 and Formula 8, $R^5$ represents hydrogen, an alkyl group having 1 to 20 carbons, an alkenyl group having 1 to 20 carbons, an alkoxy group having 1 to 7 carbons, an aryl group having 6 to 40 carbons, or a heteroaryl group having 3 to 40 carbons and m is an integer from 1 to 10. Hydrogen atoms in $R^5$ and $—(CH_2)_m—$ may be each independently substituted with one of the following groups: an alkyl group having 1 to 10 carbons, an alkoxy group having 1 to 10 carbons, an alkenyl group having 1 to 10 carbons, an aryl group having 3 to 20 carbons and a carboxyl group having 3 to 20 carbons.

As one example, in each of Formula 7 and Formula 8, $R^5$ represents a methoxy group, a carboxyethyl group, a methoxyphenol group or a methoxyethoxy group, and m represents an integer ranging from 1 to 10.

Examples of the carboxylic acid compound include acrylic acid, methacrylic acid, oleic acid, dodecanoic acid, 2-2-2-methoxyethoxyethoxy acetic acid, betacarboxyethyl acrylate, 2-2-methoxyethoxy acetic acid and methoxyphenyl acetic acid, each of which may be used alone or in a combination of two or more.

The surface modifier may be contained in the organic-inorganic hybrid composition, with respect to 100 parts by weight of the inorganic particles, in a ratio of 0.1 to 40 parts by weight, 0.1 to 5 parts by weight, 1 to 20 parts by weight, 1 to 30 parts by weight, 5 to 10 parts by weight, or 5 to 20 parts by weight. Adding the surface modifier in one of the ranges cited above can ensure improvement in the surface quality of the inorganic particles, and therefore can facilitate the dispersion of the inorganic particles within the curable resin.

Hereinafter, a preparation method for the composition according to the present invention will be briefly described.

First, in order to prepare an inorganic particle having a core-shell structure, a core is prepared and a shell is formed on the surface of the core. Once the core is prepared by mixing the precursors for forming the core, the prepared core is added to a mixture in which the precursors for forming the shell are mixed and thus the inorganic particle can be produced.

Operations of preparing the core and the shell each may be carried out at a temperature in the range of about 90° C. to about 110° C.

Also, each of the operations of preparing the core and the shell may be carried out under a high pressure in the range of about 25 atm to about 40 atm. Under such a high pressure condition, the temperature may be in the range of about 90° C. to about 110° C. but is not limited thereto. For example, the inorganic particle according to an embodiment of the present invention may be prepared by disposing the precursors for forming the core and the precursors for the forming the shell in a 1 L reactor or 1 L liner high-pressure reactor and, adjusting and maintaining the temperature and/or pressure of the reactor for about 3 hours to about 7 hours.

The operation of forming the inorganic particle may further include a drying operation. For example, when the precursors in the mixture solution are reacted completely or partially, to produce the inorganic particles, the inorganic particles can be obtained by removing the moisture in the residual mixture solution using an air dryer or spray dryer. The drying operation may be carried out under atmospheric air, and at a temperature in the range that does not affect the properties of the inorganic particles or mixture solution, for example, from about 90° C. to about 110° C. The drying operation may be carried out until the moisture is completely removed.

The organic-inorganic hybrid composition of the present invention may be prepared by mixing the inorganic particles prepared above with the curable resin. The operation of mixing the inorganic particles with the curable resin may be carried out at a temperature in the range of 20° C. to 150° C., for about 10 minutes to about 20 hours. Alternatively, the mixing of the inorganic particles with the curable resin may be carried out at a temperature in the range of 30° C. to 150° C. for about 3 hours to about 10 hours.

In the operation of mixing the inorganic particles with the curable resin, a solvent of various types may be used additionally. The solvent may be removed under a vacuum condition after the inorganic particles and the curable resin are mixed. Here the vacuum condition includes not only the theoretical conditions, but also the low pressure conditions that are practically realizable under laboratory conditions. The solvent may facilitate mixing of the inorganic particles, the surface modifier and the curable resin and help the uniform dispersing of the inorganic particles therein. Specific examples of the solvent include 1-methoxy-2-propanol, ethanol, isopropanol, ethylene glycol, methylene chloride, methanol and acetone, each of which may be used alone or in a combination of two or more.

The organic-inorganic hybrid composition described above can realize an excellent liquid-phase refractive index and luminance.

Compared to a composition including inorganic particles that are only composed of zirconia ($ZrO_2$), a composition that includes the inorganic particles prepared according to an embodiment of the present invention has been shown to have the liquid-phase refractive index improved by about 0.17 or more, and luminance about 8% or more.

Optical Member

An optical member according to an embodiment of the present invention refers to a cured product obtained by curing the organic-inorganic hybrid composition previously described. That is, the optical member includes a polymer resin that is formed by curing the curable resin, and an inorganic particle dispersed within the polymer resin. The polymer resin may be prepared by, depending on the type of curable resin, applying heat or light to the curable resin. Further, the optical member may include a base film and a polymer resin layer formed on the base film and containing the inorganic particles.

The optical member may include optical films such as a light-collecting sheet and a diffusion sheet, which are commonly used in liquid crystal display devices. As an example, the optical member may be a light-collecting sheet that focuses the incident light on the center and emits it.

Figure 1:
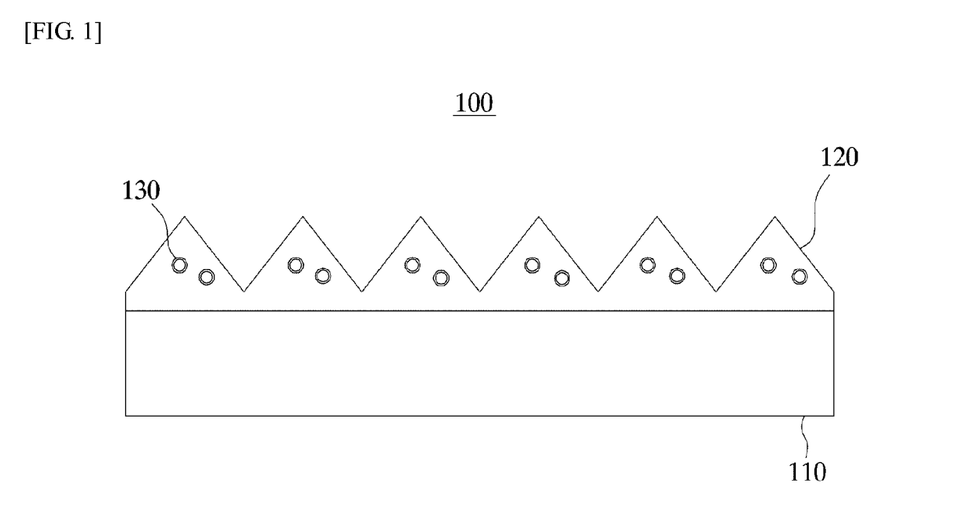
FIG. 1 is a diagram for describing a light-collecting sheet according to an embodiment of the present invention.

FIG. 1 is a diagram that shows a light-collecting sheet according to an embodiment of the present invention.

Referring to FIG. 1, a light-collecting sheet 100 may include a base film 110, a light-collecting pattern 120 located above the base film 110 and having a pattern in the form of triangular prisms and inorganic particles 130 having a core-shell structure. The inorganic particles 130 are dispersed within the light-collecting pattern 120.

The base film 110 is composed of a transparent material that permits the penetration of light. For example, the base film 110 may be a polyethylene terephthalate (PET) film.

The light-collecting pattern 120 includes a polymer resin and the inorganic particles 130 dispersed within the polymer resin. The light-collecting pattern 120 may be prepared by curing an organic-inorganic hybrid composition containing a curable resin, and inorganic particles dispersed within the curable resin and having the core-shell structure. In practice, the curable resin becomes the polymer resin upon curing, and the inorganic particles 130 may be dispersed within the polymer resin in the light-collecting sheet 100. The curable resin is practically identical to the one with the organic-inorganic hybrid composition previously described, and thus the detailed description relating thereto will not be repeated.

The light-collecting pattern 120 may be formed by injecting an organic-inorganic hybrid composition into a mold having a prism shape, and pressing the mold. During the pressing operation, the organic-inorganic hybrid composition may be cured. During the pressing operation, heat and/or light may be applied additionally. The inorganic particles 130 having the core-shell structure dispersed within the light-collecting pattern 120 can improve not only the refractive index of the light-collecting sheet 100 but also the light transmittance of the light-collecting sheet 100 and the luminance of the light that passes through the light-collecting sheet 100.

The inorganic particles 130 having the core-shell structure include a core and a shell insulating at least part of the core. The inorganic particle 130 included in the light-collecting sheet 100 is practically the same as the inorganic particles with the organic-inorganic hybrid composition of the present invention previously described. Therefore, in the interest of simplicity and concision, the detailed description relating thereto will not be repeated.

Further, the surface of the inorganic particles 130 having the core-shell structure can be modified, and therefore the detailed description relating thereto will not be repeated either.

Optical Device

An optical device according to the present invention may include the optical member previously described. As an example, the optical device may be a backlight unit that generates light in a liquid crystal display (LCD) device. Hereinafter, the optical device according to an embodiment of the present invention is described with reference to FIG. 2.

Figure 2:
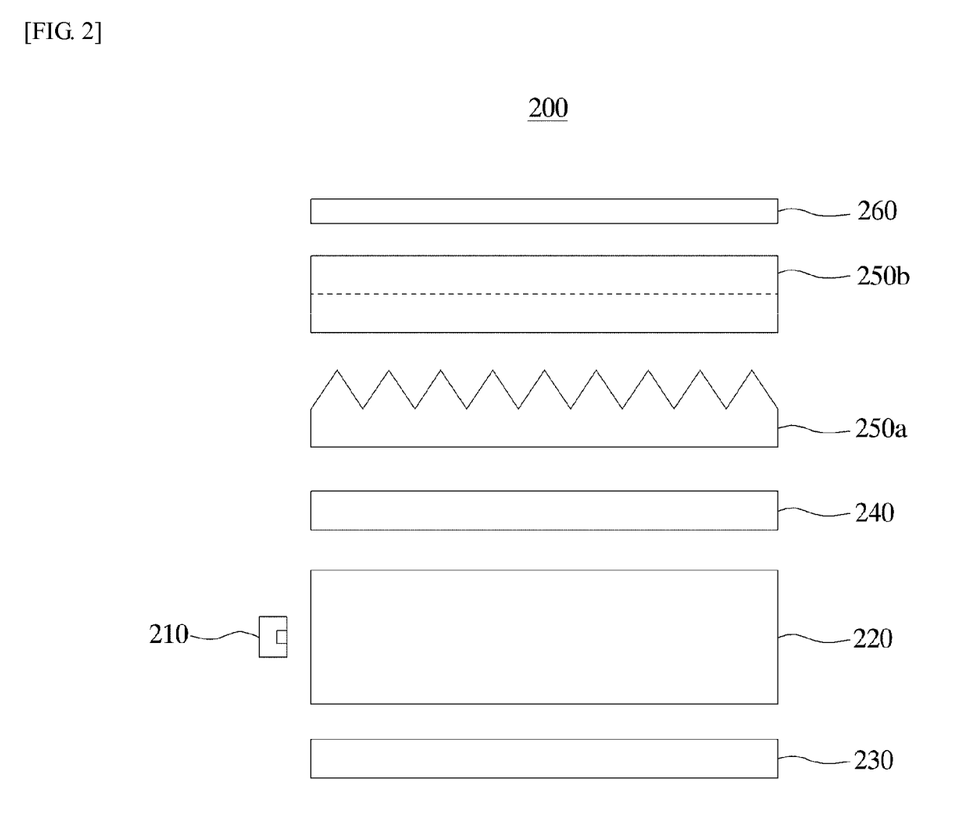
FIG. 2 is a diagram for describing an optical device according to an embodiment of the present invention.

FIG. 2 is a diagram for describing an optical device according to an embodiment of the present invention.

Referring to FIG. 2, an optical device 200 may include a light source 210, a light guide plate 220, a reflective plate 230, a diffusion sheet 240, a first light-collecting sheet 250a, a second light-collecting sheet 250b and a protection sheet 260.

The light source 210 is a part that generates light initially, and as the light source 210, a light emitting diode (LED), a cold cathode fluorescent lamp (CCFL), etc., may be used.

The light guide plate 220 guides and emits the light generated by the light source 210 in a specific direction. More particularly, incident light that has entered the light guide plate 220 travels through total reflection by emissive and reflective faces of the light guide plate 220 and so forth, and when the light enters the emissive or reflective face at an incident angle smaller than a critical angle, the light emits to the outside without undergoing total reflection.

The reflective plate 230 is disposed below the reflective face of the light guide plate 220 and reflects the light emitted from the reflective face. The light reflected by the reflective plate 230 re-enters the light guide plate 220.

The light diffusion sheet 240 diffuses the light emitted through the emissive face of the light guide plate 220, thereby making luminance of the light uniform and increasing the viewing angle.

The first and second light-collecting sheets 250a and 250b refract and collect the light diffused by the diffusion sheet 240, such that the light enters a LCD panel (not shown) in a direction perpendicular to the panel, so as to increase the luminance towards the front face of the panel. On the first light-collecting sheet 250a, there may be formed a light-collecting pattern having a pattern in the form of triangular prisms extending in an x direction, and on the second light-collecting sheet 250b, there may be formed a light-collecting pattern having a pattern in the form of triangular prisms extending in a y direction perpendicular to the x direction. The light-collecting sheets 250a and 250b may have inorganic particles having the core-shell structure dispersed therein. As the first and second light-collecting sheets 250a and 250b, the previously described light-collecting sheet 100 according to an embodiment of the present invention may be used, and thus the detailed description relating thereto will not be repeated.

The protection sheet 260 is disposed above the second light-collecting sheet 250b, and can prevent scratches and the like on the second light-collecting sheet 250b. The protection sheet 260 may not be needed in some cases.

The present invention will be described in further detail with reference to examples disclosed hereinafter. It should be understood that the examples of the present invention are set forth merely to help the understanding of the invention, not to limit the scope of the present invention.

Example 1

1. Preparation of the Core 100 g of titanium isopropoxide as a precursor of $TiO_2$ was placed and agitated in a 500 mL beaker. Then, 1.32 g of barium acetate as a precursor of $BaO_2$ and 300 g of distilled water were added, followed by addition of 66 g of acetic acid, in order to produce 467.32 g of a colloid solution containing the core. The colloid solution was then transferred into a 1 L liner high-pressure reactor, and a reaction temperature of the high-pressure reactor was adjusted so that the internal pressure of the high-pressure reactor would reach 30 atm. Once the internal pressure of the high-pressure reactor reached 30 atm, the pressure was maintained at 30 atm and the colloid solution was left for 3 hours to produce the core. With respect to the total weight of the colloid solution, the content of the core was about 17 weight %.

2. Preparation of the Particle

To the bottle containing 467.32 g of the colloid solution prepared above that contains the synthesized core, 240 g of zirconium acetate as a precursor of $ZrO_2$ and 3.75 g of aluminum isopropoxide which is a precursor of $Al_2O_3$ were added. The mixture in the bottle was allowed to react at about 30 atm for about 3 hours, using the 1 L liner high-pressure reactor to produce the inorganic particle having the core-shell structure. The inorganic particle was passed through the dryer for moisture removal.

The size of the prepared inorganic particle (here, the size refers to the "diameter" of the particle) was about 20 nm when measured using a transmission electron microscope (TEM) and the weight ratio of the core to the shell was approximately 65:35. Also, the weight ratio of Ba to Ti in the core was about 6.5:93.5, and the weight ratio of Al to Zr in the shell was about 3:97.

3. Preparation of the Composition

With respect to 100 parts by weight of trimethylolpropane triacrylate (TMPTA) purchased from Sigma-Aldrich, Inc. (USA), 40 parts by weight of the moisture-removed particles, 16 parts by weight of 2-[2-(2-methoxyethoxy)-ethoxy]acetic acid (MEEAA) purchased from Sigma-Aldrich, Inc. as a surface modifier, and 100 parts by weight of methanol as a solvent were mixed and allowed to react at 60° C. for 3 hours, and the solvent was removed by vacuum drying in order to prepare the composition of Example 1 of the present invention.

Example 2

1. Preparation of the Core 100 g of titanium isopropoxide as a precursor of $TiO_2$ was placed and agitated in a 500 mL beaker. Then, 2.31 g of barium acetate as a precursor of $BaO_2$ and 300 g of distilled water were added, followed by addition of 66 g of acetic acid, in order to produce 468.31 g of a colloid solution containing the core. The colloid solution was then transferred into a 1 L liner high-pressure reactor, and a reaction temperature of the high-pressure reactor was adjusted so that the internal pressure of the high-pressure reactor would reach 30 atm. Once the internal pressure of the high-pressure reactor reached 30 atm, the pressure was maintained at 30 atm and the colloid solution was left for 3 hours to produce the core. With respect to the total weight of the colloid solution, the content of the core was about 17 weight %.

2. Preparation of the Particle

To the bottle containing 468.31 g of the colloid solution prepared above containing the synthesized core, 240 g of zirconium acetate as a precursor of $ZrO_2$ and 3.75 g of aluminum isopropoxide which is a precursor of $Al_2O_3$, were added. The mixture in the bottle was allowed to react at about 30 atm for about 3 hours, using the 1 L liner high-pressure reactor to produce the inorganic particle having the core-shell structure. The produced inorganic particle was passed through the dryer for moisture removal.

The size of the prepared particle was about 20 nm when measured by TEM and the weight ratio of the core to the shell was about 65:35. Also, the weight ratio of Ba to Ti in the core was 15:85, and the weight ratio of Al to Zr in the shell was 3:97.

3. Preparation of the Composition

With respect to 100 parts by weight of TMPTA, 40 parts by weight of the moisture-removed particles, 16 parts by weight of MEEAA as a surface modifier, and 100 parts by weight of methanol as a solvent were mixed and allowed to react at 60° C. for 3 hours, and the solvent was removed by vacuum drying in order to prepare the composition of Example 2 of the present invention.

Example 3

1. Preparation of the Core

The preparation method for the colloid solution containing the core as described in Example 1 was repeated in order to produce 467.32 g of the colloid solution, containing the core at about 17 weight % with respect to the total weight of the colloid solution.

2. Preparation of the Particle

To the bottle containing the colloid solution prepared above containing the synthesized core, 240 g of zirconium acetate as a precursor of $ZrO_2$ was added but a precursor of $Al_2O_3$ was not added. The mixture in the bottle was allowed to react at about 30 atm for about 3 hours, using the 1 L liner high-pressure reactor to produce a particle having the core-shell structure. The size of the prepared particle was about 20 nm when measured by TEM, and the weight ratio of the core to the shell was 65:35. Also, in the core, the weight ratio of Ba to Ti was 6.5:93.5.

3. Preparation of the Composition

With respect to 100 parts by weight of TMPTA, 40 parts by weight of the moisture-removed particles, 16 parts by weight of MEEAA as a surface modifier, and 100 parts by weight of methanol as a solvent were mixed and allowed to react at 60° C. for 3 hours, and the solvent was removed by vacuum drying in order to prepare the composition of Example 3 of the present invention.

Example 4

1. Preparation of the Core

The preparation method for the colloid solution containing the core as described in Example 2 was repeated in order to produce 468.31 g of the colloid solution, containing the core at about 17 weight % with respect to the total weight of the colloid solution.

2. Preparation of the Particle

To the bottle containing the colloid solution prepared above containing the synthesized core, 240 g of zirconium acetate as a precursor of $ZrO_2$ was added but a precursor of $Al_2O_3$ was not added. The mixture in the bottle was allowed to react at about 30 atm for about 3 hours using the 1 L liner high-pressure reactor, to produce the inorganic particle having the core-shell structure. The inorganic particle was passed through a dryer for moisture removal.

The size of the prepared inorganic particle was about 30 nm when measured by TEM, and the weight ratio of the core to the shell was 65:35. Also, in the core, the weight ratio of Ba to Ti was 15:85.

3. Preparation of the Composition

With respect to 100 parts by weight of TMPTA, 40 parts by weight of the moisture-removed particles, 16 parts by weight of MEEAA as a surface modifier, and 100 parts by weight of methanol as a solvent were mixed and allowed to react at 60° C. for 3 hours, and the solvent was removed by vacuum drying in order to prepare the composition of Example 4 of the present invention.

Example 5

1. Preparation of the Core

A method substantially the same as the preparation method for the colloid solution containing the core as described in Example 1 was repeated in order to produce 467.32 g of the colloid solution, containing the core at about 17 weight % with respect to the total weight of the colloid solution.

2. Preparation of the Particle

To the bottle containing 467.32 g of the colloid solution prepared above containing the synthesized core, 240 g of zirconium acetate as a precursor of $ZrO_2$, 3.75 g of aluminum isopropoxide which is a precursor of $Al_2O_3$, and 0.48 g of chromium acetate were added. The mixture in the bottle was allowed to react at about 30 atm for about 3 hours using the 1 L liner high-pressure reactor, to produce an inorganic particle having the core-shell structure. The produced inorganic particle was passed through a dryer for moisture removal.

The size of the prepared particle (here, the size refers to the "diameter" of the particle) was about 20 nm when measured using a TEM and the weight ratio of the core to the shell was approximately 65:35. Also, in the core, the weight ratio of Ba to Ti was about 6.5:93.5, and in the shell, the weight ratio of Cr to Al to Zr was about 0.25:3:96.75.

3. Preparation of the Composition

With respect to 100 parts by weight of TMPTA, 40 parts by weight of the moisture-removed particles, 16 parts by weight of MEEAA as a surface modifier, and 100 parts by weight of methanol as a solvent were mixed and allowed to react at 60° C. for 3 hours, and the solvent was removed by vacuum drying in order to prepare the composition of Example 5 of the present invention.

Comparative Example 1

With respect to 100 parts by weight of TMPTA, 40 parts by weight of zirconia particles having the particle size of about 35 nm, 16 parts by weight of MEEAA as a surface modifier, and 100 parts by weight of methanol as a solvent were mixed and allowed to react at 60° C. for 3 hours, and the solvent was removed by vacuum drying in order to prepare the composition of Comparative Example 1.

That is, in Comparative Example 1, the particle composed only of zirconia were used as the inorganic particle.

Comparative Example 2

With respect to 100 parts by weight of TMPTA, 16 parts by weight of MEEAA as a surface modifier, and 100 parts by weight of methanol as a solvent were mixed and allowed to react at 60° C. for 3 hours, and the solvent was removed by vacuum drying in order to prepare the composition of Comparative Example 2.

That is, the composition according to Comparative Example 2 does not include inorganic particles.

[Experimental Example 1]—Evaluation of Characteristics in Luminance and Mechanical Strength To the composition of Example 1, difunctional urethane acrylate and tetrafunctional urethane acrylate, and diphenyl (2,4,6-trimethylbenzoyl)phosphine oxide (TPO) as a photoinitiator were added. And the mixture was mechanically agitated for about 3 hours, and used to form a light-collecting pattern on a poly ethylene terephthalate (PET) film, in order to form a first light-collecting sheet. Here a metal lamp was used as a source of UV rays to form the light-collecting pattern.

By the same method used to prepare the first light-collecting sheet, a second light-collecting sheet, a third light-collecting sheet, a fourth light-collecting sheet and a fifth light-collecting sheet were formed using the compositions of Example 2 to 5, respectively.

Also, by the same method used to prepare the first light-collecting sheet, a first comparative sheet and a second comparative sheet were formed using the compositions of Comparative Example 1 and Comparative Example 2, respectively.

With respect to each of the first to fifth light-collecting sheets and the first and second comparative sheets, the pitch of the light-collecting pattern was about 21 μm, and the total thickness of the light-collecting sheet including the PET film was about 87.5 μm. The pitch on the light-collecting pattern refers to a distance between the neighboring triangular prisms, and more specifically, the distance from the mountain of the first prism pattern to the mountain of the neighboring second prism pattern.

The luminance of each of the first to fifth light-collecting sheets and the first and second comparative sheets was measured. Luminance was measured using a commonly used luminance meter, BM7 (product name) of Topcon Corporation, and for the lamp, a metal lamp was used. Luminance measurements of the first to fifth light-collecting sheets and the first and second comparative sheets are shown in Table 1. In Table 1, the luminance of each sheet is expressed as percentage relative to the reference luminance of the first comparative sheet being 100%.

Also, in order to evaluate characteristics in the mechanical strength, a LCD panel and strengthened glass were laminated, in that order, above each of the first to fifth light-collecting sheets and the first and second comparative sheets, and then a bead weighing about 36 g was placed about 6 cm apart from the strengthened glass. The bead was dropped on the strengthened glass, and the point of impact on the LCD panel was examined with the naked eye. The results were shown in Table 1.

By the same method, the bead was placed about 10 cm apart from the strengthened glass, and subsequently dropped and the point of impact on the LCD panel was examined with the naked eye. The results were shown in Table 1.

TABLE 1

| Classification | Luminance (%) | Presence or Absence of Mark | |
| --- | --- | --- | --- |
| | | 6 cm | 10 cm |
| 1st Light-Collecting Sheet | 108.1 | Absent | Absent |
| 2nd Light-Collecting Sheet | 107.2 | Absent | Absent |
| 3rd Light-Collecting Sheet | 102.7 | Absent | Absent |
| 4th Light-Collecting Sheet | 101.8 | Absent | Absent |
| 5th Light-Collecting Sheet | 108.1 | Absent | Absent |
| 1st Comparative Sheet | 100 | Absent | Absent |
| 2nd Comparative Sheet | 95 | Present | Present |

Referring to Table 1, the first to fifth light-collecting sheets were found to have an improved luminance compared to the first comparative sheet. That is, the optical sheets made of the composition that includes the inorganic particles made of the core containing titanium and barium and the shell containing at least one of zirconium, aluminum and chromium were shown to have an improved luminance compared to the optical sheet made of the composition that includes the inorganic particles made of zirconia alone.

Also, in the case of the first and second light-collecting sheets that include the inorganic particles whose shells contain zirconium and aluminum, their luminance improved significantly more than that of the third and fourth light-collecting sheets. That is, the optical sheets made of the composition that includes the inorganic particles whose shells contain zirconium and aluminum are shown to improve luminance more than the optical sheets made of the composition that includes the inorganic particles whose shells contain zirconium alone. And it was also shown that the fifth light-collecting sheet, which is formed by the composition that includes the inorganic particles whose shells contain zirconium, aluminum and chromium, is not so different from the first light-collecting sheet in terms of luminance.

Also, on the light-collecting sheets that include the inorganic particles, namely, the first to fifth light-collecting sheets and the first comparative sheet, there was no observable mark at the point of impact, whereas on the second comparative sheet there was an observable mark. That is, the first to fifth light-collecting sheets and the first comparative sheet did not suffer damage due to external stress and the prism mountains of their prism patterns did not collapse.

[Experimental Example 2]—Evaluation of Characteristics in the Liquid-Phase Refractive Index The liquid-phase refractive index of each of the compositions of Example 1 to Example 5 and Comparative Example 1 was measured. The liquid-phase refractive index was measured by an Abbe refractometer DR-M2 (model, manufactured by ATAGO CO., LTD., Japan). The results of the liquid-phase refractive index measurement of the compositions of Example 1 to Example 5 and Comparative Example 1 were shown in Table 2.

TABLE 2

| Classification | Liquid-Phase Refractive Index |
| --- | --- |
| Example 1 | 1.618 |
| Example 2 | 1.615 |
| Example 3 | 1.618 |
| Example 4 | 1.615 |

TABLE 2-continued

| Classification | Liquid-Phase Refractive Index |
| --- | --- |
| Example 5 | 1.618 |
| Comparative Example 1 | 1.601 |

Referring to Table 2, the compositions of Example 1 to Example 5 were shown to have an increased liquid-phase refractive index, compared to that of Comparative Example 1. That is, the compositions that include the inorganic particle composed of the core containing titanium and barium and the shell containing at least one of zirconium, aluminum and chromium are shown to have an increased liquid-phase refractive index, compared to the composition that includes the inorganic particle composed of zirconia alone.

It is also shown that Example 1 and Example 3, in which the compositions include the inorganic particle whose weight ratio of Ba to Ti in the core is 6.5:93.5, have an improved liquid-phase refractive index, compared to the compositions of Example 2 and Example 4 which include the inorganic particle whose weight ratio of Ba to Ti in the core is 15:85. That is, the addition of barium to the core of the inorganic particle can improve the liquid-phase refractive index, however, the excessive addition of barium may decrease the liquid-phase refractive index. Therefore, in the present invention, the core of the inorganic particle is prepared such that the weight ratio of titanium and barium is about 100:0.1-15.

[Experimental Example 3]—Evaluation of Characteristics in Light Transmittance

To the composition of Example 1, difunctional urethane acrylate, tetrafunctional urethane acrylate, and diphenyl(2,4,6-trimethylbenzoyl)phosphine oxide (TPO) were added and the mixture was agitated for about 3 hours, to prepare a first planar film. Here, as a light source for curing the composition, an arc lamp (manufactured by UNILAM, Korea) including an UV lamp with the wavelength of 400 nm was used.

By the same method used to form the first planar film, a second planar film, a third planar film, a fourth planar film, and a fifth planar film were formed using the compositions of Example 2 to Example 5, respectively.

Also, by the same method used to form the first planar film, a first comparative film was prepared using the composition of Comparative Example 1.

The first to fifth planar films and the first comparative film were all formed with a thickness of 60 μm.

The light transmittance of each of the first to fifth planar films and the first comparative film was measured. The light transmittance was measured by a UV-visible spectrophotometer (Manufacturer: Agilent Co., model: CARY 4000, type: mercury lamp). The results of light transmittance measurement of the first to fifth planar films and the first comparative film are shown in Table 3.

TABLE 3

| Classification | Light Transmittance |
| --- | --- |
| 1st Planar Film | 77% |
| 2nd Planar Film | 77% |
| 3rd Planar Film | 70% |
| 4th Planar Film | 70% |
| 5th Planar Film | 77% |
| 1st Comparative Film | 70% |

Referring to Table 3, the first and second planar films that are composed of the compositions including the inorganic particles whose shells contain zirconium and aluminum, are shown to have an improved light transmittance compared to the third and fourth planar films and the first comparative film. That is, it is shown that an optical film that is made of the composition including the inorganic particles whose shells contain zirconium and aluminum, has more significantly improved light transmittance compared to an optical film that is formed by the composition including the inorganic particles whose shells contain zirconium alone, or the inorganic particles composed of zirconia alone.

Also, the fifth planar film that is formed by the composition including the inorganic particles whose shells contain zirconium, aluminum and chromium, was shown to have a comparable light transmittance with the first and second planar films.

[Experimental Example 4]—Evaluation of Changes on Chromaticity Coordinates

An accelerated weathering test was carried out under ASTM D 4674 conditions on each of the first to fifth light-collecting sheets made of the compositions of Example 1 to 5, and the first comparative sheet made of the composition of Comparative Example 1. As an accelerated weathering tester, a QUV/spray (product name, IJ Inc., Korea) was used and the samples were left for 15 minutes at 50° C. In order to assess the degree of yellowing of the first to fifth light-collecting sheets and the first comparative sheet, the change in a value along the y-axis ($\Delta y$) on CIE chromaticity coordinates was measured, and the results are shown in Table 4. The change in value along the y-axis ($\Delta y$) on CIE chromaticity coordinates was measured by BM7 luminance meter.

In Table 4, the smaller $\Delta y$, the less yellowing is caused.

TABLE 4

| Classification | Change in Value on Chromaticity Coordinates ($\Delta y$) |
| --- | --- |
| 1st Light-Collecting Sheet | 0.0031 |
| 5th Light-Collecting Sheet | 0.0009 |
| 1st Comparative Sheet | 0.0029 |

Referring to Table 4, the fifth light-collecting sheet shows a significantly small $\Delta y$ compared to that of the first light-collecting sheet and the first comparative sheet. That is, a light-collecting sheet that is formed by the composition including the inorganic particle whose shell contains chromium, can inhibit the yellowing effect far more effectively than the light-collecting sheet that is formed by the composition including the inorganic particle whose shell does not contain chromium. Therefore, the addition of chromium to the shell of inorganic particle can effectively inhibit the yellowing effect without causing changes in the physical properties such as luminance, light transmittance and refractive index.

The organic-inorganic hybrid composition according to an embodiment of the present invention can improve the liquid-phase refractive index of the composition by utilizing an inorganic particle having a core-shell structure composed of a core containing titanium and barium and a shell containing at least one selected from zirconium, aluminum and chromium. Therefore, an optical member, when formed using the organic-inorganic hybrid composition described above, can have improved luminance and light transmittance.

While the present invention has been described with reference to certain exemplary embodiments thereof, it will be understood by those skilled in the related art that various changes in form and details may be made therein without departing from the gist and scope of the present invention as defined by the appended claims.

What is claimed is:

1. An organic-inorganic hybrid composition comprising:
a curable resin; and
inorganic particles dispersed in the curable resin,
the inorganic particles consisting of a core and a shell in direct contact with the core,
the core consisting of oxides of titanium and oxides of barium; and
the shell consisting of oxides of zirconium, oxides of aluminum, oxides of chromium, and optionally a surface modifier that modifies a surface of the inorganic particles, wherein a weight ratio of a combined weight of zirconium and aluminum to chromium in the shell ranges from 100:0.01 to 100:10.

2. The organic-inorganic hybrid composition of claim 1, wherein a weight ratio of the core to the shell ranges from 40:60 to 90:10.

3. The organic-inorganic hybrid composition of claim 1, wherein an average particle diameter of the inorganic particles ranges from 1 nm to 80 nm.

4. The organic-inorganic hybrid composition of claim 1, wherein the barium content of the core ranges from 0.1 to 15 parts by weight, with respect to 100 parts by weight of titanium.

5. The organic-inorganic hybrid composition of claim 4, wherein the aluminum content of the shell ranges from 0.1 to 20 parts by weight, with respect to 100 parts by weight of zirconium.

6. The organic-inorganic hybrid composition of claim 1, wherein the curable resin is a photo-curable resin or a thermosetting resin.

7. The organic-inorganic hybrid composition of claim 6, wherein a weight ratio of the curable resin to the inorganic particles ranges from 100:5 to 100:70.

8. The organic-inorganic hybrid composition of claim 6, wherein the curable resin includes a compound having the following Formula 1:

[Formula 1]

wherein the above Formula 1,
$R_1$ represents an alkylene group having 2 to 10 carbons and in which a hydroxyl group is substituted or unsubstituted,
R2 represents hydrogen or a methyl group,
Ar represents an arylene group having 6 to 40 carbons or a heteroarylene group having 3 to 40 carbons,
Q represents oxygen or sulfur, and
m and n each independently represent integers from 0 to 8.

9. The organic-inorganic hybrid composition of claim 6, wherein the curable resin includes a compound having the Formula 2:

[Formula 2]

wherein the above Formula 2,
$R_1$ represents hydrogen or a methyl group,
R2 represents an alkylene group having 2 to 10 carbons and in which a hydroxyl group is substituted or unsubstituted,
Ar represents an aryl group having 6 to 40 carbons or a heteroaryl group having 3 to 40 carbons,
m represents an integer from 0 to 8, and
P represents oxygen or sulfur.

10. The organic-inorganic hybrid composition of claim 6, wherein the curable resin includes a compound having the following Formula 3:

[Formula 3]

wherein the above Formula 3,
$R_1$ represents hydrogen or a methyl group,
R2 represents an an alkylene group having 2 to 10 carbons and in which a hydroxyl group is substituted or unsubstituted, $Ar_i$ and $Ar_e$ each independently represent an arylene group having 6 to 40 carbons or a heteroarylene group having 3 to 40 carbons,
P represents oxygen or sulfur,
Q represents oxygen or sulfur, and
j, n, m represent independently an integer ranging from 0 to 8, and
Y represents $-C(CH_3)_2-$, $-CH_2-$, $-S-$, 11. The organic-inorganic hybrid composition of claim 1, wherein the shell of the inorganic particles includes the surface modifier.

12. The organic-inorganic hybrid composition of claim 11, wherein the surface modifier is a silane compound or a carboxylic acid compound.

13. The organic-inorganic hybrid composition of claim 11, wherein the surface modifier is contained in a weight ratio ranging from 0.1 to 40 parts by weight, with respect to 100 parts by weight of the inorganic particle.

14. An optical member comprising the organic-inorganic hybrid composition of claim 1.

15. The optical member of claim 14, wherein the polymer resin layer has a light-collecting pattern in the form of triangular prisms on its emissive face.

16. The optical member of claim 14, wherein an average particle diameter of the inorganic particles ranges from 1 nm to 80 nm.

17. An optical device comprising:
a light source that generates light;
a diffusion sheet that diffuses the light provided by the light source; and
a light-collecting sheet that collects the light diffused by the diffusion sheet,
wherein the light-collecting sheet comprises a layer of the organic-inorganic hybrid composition of claim 1.

* * * * *